United States Patent Office

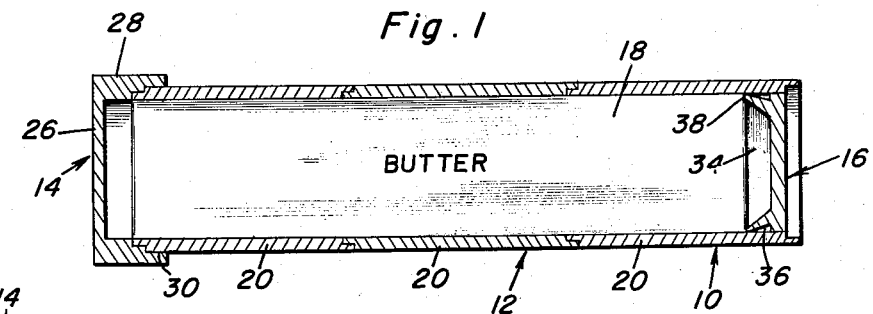
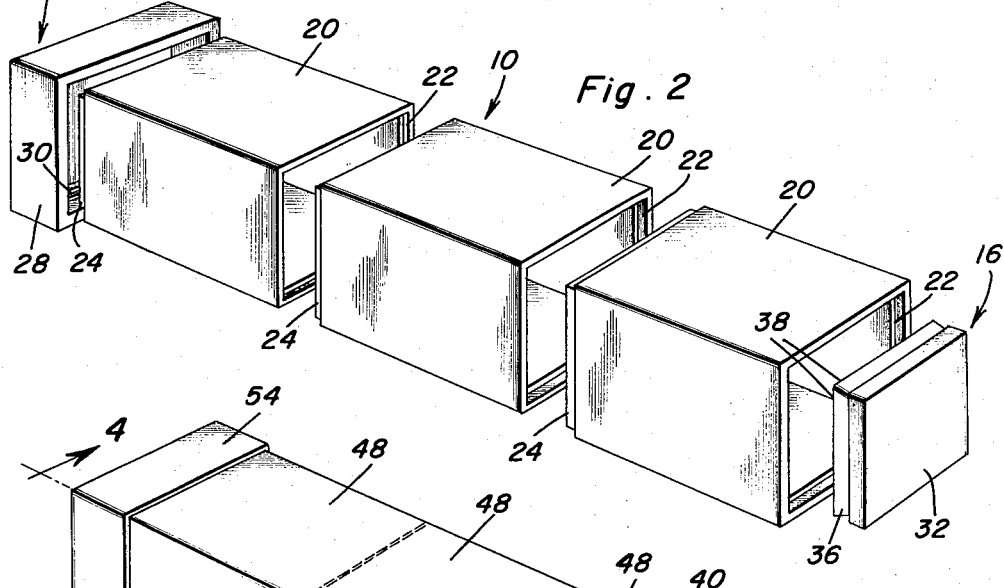
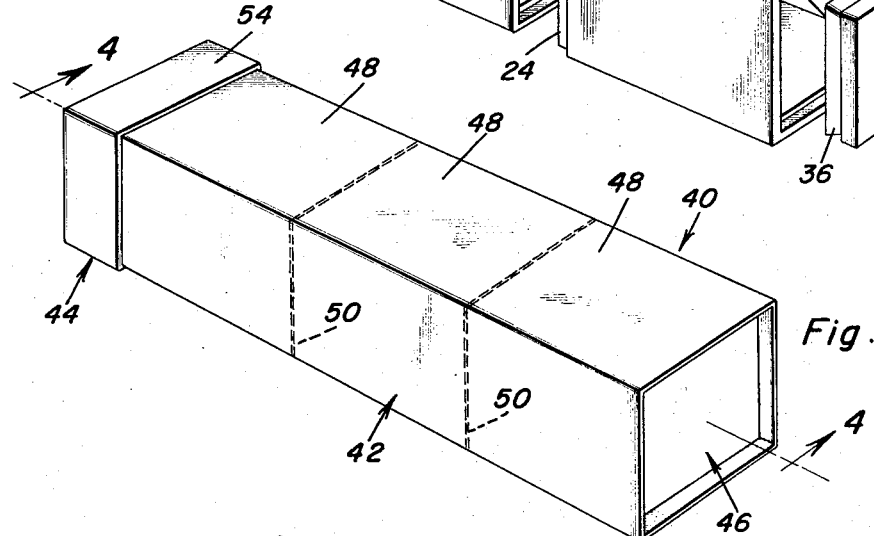
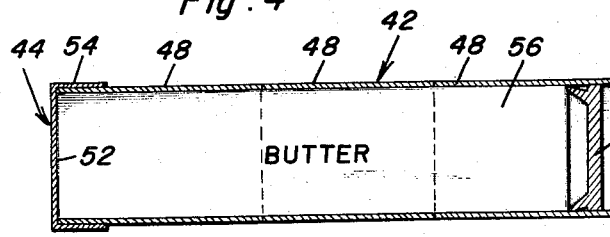

2,972,407
Patented Feb. 21, 1961

2,972,407

BUTTER DISPENSER WITH SECTIONAL HOUSING

George D. Taylor, 207 N. Virginia, Amarillo, Tex.

Filed Nov. 15, 1956, Ser. No. 622,418

1 Claim. (Cl. 206—56)

This invention relates in general to dispensing devices and more specifically to an improved butter dispenser.

At the present time in the average home butter is kept either in an open dish such as a saucer, or in a special butter dish. While the special butter dish does protect the butter satisfactorily within a refrigerator or the like, at such time as the butter is being used, the entire length of the stick of butter is exposed. Further, it is inconvenient to cut a pat of butter from the stick of butter when it is in the butter dish due to the manner in which the butter is supported.

It is therefore the primary object of this invention to provide an improved dispenser for butter, the dispenser including a housing which is of a size to receive a stick of butter and which has one end thereof normally closed by a removable cover and having the opposite end thereof provided with a pusher plug for pushing the stick of butter through the housing, the pusher plug being of such a nature whereby the desired amount of butter may be pushed through the housing and the butter chopped off as desired to form pats or the like.

Another object of this invention is to provide an improved butter dispenser which is substantially the same size as the stick of butter whereby the storage of the individual stick of butter for use occupies little more space than the stick of butter within the refrigerator thus increasing the capacity of the refrigerator in which the butter is stored.

Another object of this invention is to provide a butter dispenser which has a sectional housing, the housing being so formed whereby the sections thereof may be removed as butter is dispensed through to facilitate the accessibility of a pusher plug which is used in dispensing the butter and at the same time reducing the storage space required for the storage of the butter as the length of the butter stick decreases.

A further object of this invention is to provide an improved butter dispenser which includes a sectional housing, the housing being formed of reusable sections which are identical and which may be separated as butter is dispensed therefrom, the sections being recombinable for reception of a new stick of butter, the short length of the individual sections facilitating the cleaning of the butter dispenser.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a longitudinal sectional view taken through a preferred form of the butter dispenser which is the subject of this invention and shows the relationship of the various components thereof and the position of the stick of butter therein;

Figure 2 is an enlarged exploded perspective view of the butter dispenser of Figure 1 and shows the specific details of each and every component thereof;

Figure 3 is an enlarged perspective view of a modified form of butter dispenser; and Figure 4 is a longitudinal sectional view on a reduced scale take substantially upon the plane indicated by the section line 4—4 of Figure 3 and shows the specific details of the construction of the butter dispenser of Figure 3.

Referring now to the drawings in detail, it will be seen that there is illustrated in Figures 1 and 2 a preferred form of butter dispenser which is referred to in general by the reference numeral 10. The butter dispenser 10 includes an elongated housing 12 which is of a size to receive a conventional stick of butter. The housing 12 has the opposite ends thereof open and one end is closed by a removable cover 14. The opposite end of the housing 12 is closed by a pusher plug 16 which is used for dispensing of the butter 18 from the housing 12.

It is to be noted that the housing 12 is formed of identical sections 20. It is preferred that the sections 20 be formed of a suitable plastic product although other suitable materials may be utilized including metals such as stainless steel and the like. The sections 20, as is illustrated in the drawings, are generally rectangular in cross section and are provided at one end with an internal recess 22 and at the other end with an inner projection 24. The recess 22 and the projection 24 are complementary so that adjacent ones of the sections 20 may be readily interlocked in the manner best illustrated in Figure 1.

The closure member 14 includes an end wall 26 which is connected to a body portion 28. The body portion 28 is provided with an internal recess 30 which is configurated to receive one end of one of the sections 20. The closure member 14 is preferably formed of the same material as is the housing 12.

The pusher plug 16 is of a cross-section corresponding to the internal cross section of the housing 12. The rear surface of the pusher plug 16 is planar to form a thumb or finger engaging surface 32. A forward part of the pusher plug 16 is recessed as at 34 to facilitate the engagement thereof with the butter 18. The pusher plug 16 is further provided with a peripheral recess 36 which combines with the forward recess 34 to present a forward knife edge 38 and reduces frictional contact of the pusher plug with the housing. The knife edge 38 is positioned at the point of contact between the butter 18 and the pusher plug 16 and serves to engage the interior of the housing 12 in a scraping manner. Thus the pusher plug 16 serves not only to dispense the butter 18 from the housing 12 as is desired, but also to scrape the interior surfaces of the sections 20 of the housing 12 as the butter 18 is being dispensed.

Because of the particular material from which the butter dispenser 10 is formed and because the housing 12 is formed of relatively short sections, it will be readily apparent that the butter dispenser 10 may be readily cleaned for reuse.

When using the butter dispenser 10, a full stick of butter 18 is placed within the housing 12. As the dispensing operation continues, the pusher plug 16 will move from the endmost one of the sections 20 to the central section 20. At this time the endmost section 20 of the housing 12 will be removed and stored. As the pusher plug 16 proceeds through the central section 20 and into the other endmost section 20, the central section 20 is removed. Thus as the butter 18 is dispensed from the butter dispenser 10, the housing 12 may be shortened to both facilitate the engagement of the pusher plug 16 with one's thumb or finger and at the same time to decrease the amount of storage space required for the butter and butter dispenser.

Referring now to Figures 3 and 4 in particular, it will be seen that there is illustrated a modified form of butter dispenser which is referred to in general by the reference numeral 40. The butter dispenser 40 includes an elongated housing 42 which has the opposite ends thereof open. One end of the housing 42 is closed by a closure member 44 whereas the other end thereof is closed by a pusher plug 46.

The butter dispenser 40 differs from the butter dispenser 10 primarily in the construction of the housing 42. The housing 42 is intended to be of the disposable type and is preferably formed of a cheap paper product which has at least the interior thereof provided with a waxed or similar coating. If desired, the exterior thereof may also be provided with such a coating. The housing 42 is initially an integral unit and has sections 48 thereof defined by break lines 50. The break lines 50 may be in the form of perforations or scoring as desired.

The closure member 44 is of a simple construction and merely includes an end wall 52 and a body portion 54, the body portion 54 being of a size to be received over one end of the housing 42.

As is best illustrated in Figure 4, the pusher plug 46 is of the same construction as the pusher plug 16. Accordingly, a further description of the pusher plug 46 is believed to be unnecessary with the exception of the statement that the pusher plug 46 may be formed of any conventional material, such as a paper product, wood, plastic, etc.

In the use of the butter dispenser 40, butter 56 thereof is dispensed in the manner described above with respect to the butter dispenser 10. As the pusher plug 46 moves out of the endmost section 48 into the central section 48, the endmost section 48 of the housing 42 may be broken off by twisting the housing 42. The butter 56 is then continued to be dispensed by using the pusher plug 46 until the pusher plug 46 has moved out of the central section 48 into the endmost section 48 normally carrying the closure member 44. The central section 48 is then broken off from the other endmost section 48.

It is to be understood that the butter dispenser 40 is to be formed of relatively cheap materials and if desired, one may package the sticks of butter in the butter dispenser 40 for sale.

It is pointed out at this time that the containers are of such a nature whereby a stick of butter may be stored in a vertical position rather than horizontal making it readily accessible and occupying a less space than that which is normally occupied by butter. Also, when butter is stored in the containers, it may be directly applied to certain foods without recourse to the use of a knife. These foods include corn on the cob, toast, etc. Also, the butter may be directly applied to cooking pans and the like without the necessity of using wax paper or a brush as heretobefore been used for the application of butter.

Although the dispensers 10 and 40 have been specifically described for use in dispensing butter, it is to be understood that the invention is not intended to be so limited. If it is desired, the dispensers may be used for dispensing any other types of semi-solid stick products such as soap, etc., and the cross-section of the housings 12 and 42 may be varied to accommodate the particular shape in which the product to be dispensed is normally found.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A dispenser comprising an elongated housing for containing a semi-solid product and having open ends, a pusher plug slidably fitted in one end of the housing for dispensing said semi-solid product out of the other end of the housing, said pusher plug being solid and having a product engaging face and a peripheral groove therein rearwardly of said product engaging face, said groove having a forwardly extending outwardly sloping flat bottom face, and said product engaging face having a flat bottomed recess therein provided with a forwardly extending outwardly sloping face, said face of said groove and said face of the recess converging to a knife edge on said pusher plug engaging said housing and to reduce frictional contact between said pusher plug and said housing and to scrape said semi-solid product off said housing.

References Cited in the file of this patent
UNITED STATES PATENTS

| | | |
|---|---|---|
| 368,704 | Bryant | Aug. 23, 1887 |
| 1,377,659 | Boe | May 10, 1921 |
| 1,695,104 | Huntley | Dec. 11, 1928 |
| 1,978,025 | McCown | Oct. 23, 1934 |
| 2,056,032 | Berman | Sept. 29, 1936 |
| 2,138,019 | Benoit | Nov. 29, 1938 |
| 2,192,479 | Nissen | Mar. 5, 1940 |
| 2,270,935 | Doering | Jan. 27, 1942 |
| 2,430,718 | Jacobson | Nov. 11, 1947 |
| 2,547,149 | Peterson | Oct. 24, 1950 |
| 2,690,080 | Rich | Sept. 28, 1954 |
| 2,691,980 | Jones | Oct. 19, 1954 |

FOREIGN PATENTS

| | | |
|---|---|---|
| 436,754 | Italy | June 14, 1948 |
| 827,105 | Germany | Jan. 7, 1952 |
| 1,049,134 | France | Aug. 12, 1953 |